US005237542A

United States Patent [19]

Burke et al.

[11] Patent Number: 5,237,542

[45] Date of Patent: Aug. 17, 1993

[54] WIDEBAND, DERIVATIVE-MATCHED, CONTINUOUS APERTURE ACOUSTIC TRANSDUCER

[75] Inventors: Shawn E. Burke, Andover, Mass.; James E. Hubbard, Jr., Derry, N.H.

[73] Assignee: The Charles Stark Draper Laboratory, Inc., Cambridge, Mass.

[21] Appl. No.: 677,799

[22] Filed: Mar. 29, 1991

[51] Int. Cl.[5] .................... G01S 15/00; H04R 17/00

[52] U.S. Cl. .................... 367/103; 367/119; 367/124; 367/153; 367/157; 310/334; 310/337

[58] Field of Search .............. 367/103, 105, 119, 121, 367/122, 124, 125, 126, 129, 153, 157, 905; 310/322, 334, 337

[56] References Cited

U.S. PATENT DOCUMENTS

| | | | |
|---|---|---|---|
| 4,166,999 | 9/1979 | Brady, III | 367/105 |
| 4,167,753 | 9/1979 | Lynk | 367/105 |

OTHER PUBLICATIONS

The "Monopulse" Sonar Concept, and Its Realization for AUV Application, pp. 1-5, (1990).

Henderson, T. L., "Matched Beam Theory of Unambiguous Broadband . . . ", Journal of Acoust. Soc. of Am., 78(2) Aug. 1985.

Henderson, T. L. "Wide-band Monopulse Sonar:", IEEE Journal of Oceanic Engineering, vol. 14, No. 1, Jan. 1989.

Henderson et al. "Seafloor Profiling . . . ", IEEE Journal of Oceanic Engineering, vol. 14, No. 1, Jan. 1989.

Lacker et al., "Wideband Monopulse . . . ", IEEE Journal of Oceanic Engineering, vol. 15, No. 1, Jan. 1990.

Loutzenheiser et al., "Thickness/Twist Vibrations", Journal of Acoustic Soc. of Am., vol. 41, No. 4, Part 2, Aug. 1966.

Tomikawa et al., "Wide Band Ultrasonic Transducer", Japanese Journal of Appl. Physics, vol. 23, 1984, Supp. 23-1, pp. 113-115.

Busch-Vishniac et al., "A New Approach to Transducer Design", Journal Acoust. Soc. of Am. 76(6), Dec. 1984.

Hughes, "Advanced Underwater Sensors", Sea Technology, Aug. 1990.

*Primary Examiner*—J. Woodrow Eldred

*Attorney, Agent, or Firm*—Iandiorio & Dingman

[57] ABSTRACT

A wideband, derivative-matched, continuous aperture acoustic transducer includes a first sensor area having a predetermined spatial shading and a second sensor area having a spatial shading which is the spatial derivative of the spatial shading of the first area; the first and second spatial shaded areas are superimposed and co-extensive along the sensing axis.

9 Claims, 7 Drawing Sheets

WIDEBAND, DERIVATIVE-MATCHED, CONTINUOUS APERTURE ACOUSTIC TRANSDUCER

BACKGROUND OF INVENTION

Conventional sonar systems traditionally consist of a plurality of discrete transducers aligned in linear or planar arrays. Directional resolution is accomplished through analog or digital electronics by beam steering. Such systems usually require a large number of discrete transducers and electronics which includes signal conditioning amplifiers and digital computers. These are complex systems which are large, heavy, difficult to maintain and calibrate, expensive, and require significant electrical power.

One recent approach proposes an alternative means for obtaining high resolution without steering using derivative matched spatially shaded sensing apertures consisting of a number of discrete sensors. However, this implementation introduces directional ambiguities and/or implicit bandwidth limitations to prevent spatial aliasing. In addition, a large number of discrete sensors is required which continues the problem of large size, weight, expense, maintenance and calibration.

SUMMARY OF INVENTION

It is therefore an object of this invention to provide an improved transducer particularly advantageous for sonar systems.

It is a further object of this invention to provide such an improved transducer which enjoys derivative matching advantages without the attendant need for a large number of discrete sensors and associated electronics.

It is a further object of this invention to provide such an improved transducer which has wideband capability without spatial aliasing.

It is a further object of this invention to provide such an improved transducer which eliminates directional ambiguities occurring with discrete sensor elements.

It is a further object of this invention to provide such an improved transducer which is smaller, lighter, less expensive, and easier to calibrate and maintain.

The invention results from the realization that an extremely simple yet accurate wideband, derivative-matched, continuous aperture acoustic sensing system can be achieved by effecting the derivative-matched shading, physically, in the transducer with two sensor areas, one of which possesses a shading which is the spatial derivative of the other and with the two sensor areas superimposed and coincident along the scanning axis.

This invention features a wideband, derivative-matched, continuous aperture acoustic transducer. There is a first sensor area having a predetermined spatial shading and a second sensor area having a spatial shading which is the spatial derivative of the spatial shading of the first area. The first and second spatially shaded areas are superimposed and coextensive along the sensing axis.

In a preferred embodiment, there are means for combining the output of the first sensor area with the output of the second sensor area to obtain a signal proportional to the cosine of the angle of incidence of an acoustic wavefront. The means for combining may include means for integrating and scaling the output of the second sensor and means for dividing the output of this integrated and scaled second sensor signal by the output of the first sensor. One of the sensor areas may include at least a portion of the other sensor area or all of the other sensor area. Typically the first sensor area includes the second sensor area. The shape of the second sensor area may be the spatial derivative of the shape of the first sensor area, or the spatial varying sensitivity characteristic of the second sensor area may be the spatial derivative of the spatially varying sensitivity characteristic of the first sensor area. The spatially varying sensitivity characteristic may be piezoelectric sensitivity.

The transducer may include a pair of electrodes and a sensor medium between them. The first and second sensor areas may be defined in and contained in the sensor medium, or the first and second sensor areas may be defined by an electrode and contained in the sensor medium. The transducer may include a first sensor medium and a second sensor medium and electrode means for sensing the output of the sensor mediums. Then the first sensor medium includes the first sensor area and the second sensor medium includes the second sensor area.

The first sensor area may be rhombic and the second sensor area rectangular. Or, the first sensor area may be triangular and the second sensor area rectangular; or, the first sensor area may be sinusoidal and the second cosinusoidal.

The transducer may include a third sensor area superimposed on the first and second sensor areas and have a plurality of independent sensor sections which may be conventionally processed.

DISCLOSURE OF PREFERRED EMBODIMENT

Other objects, features and advantages will occur to those skilled in the art from the following description of a preferred embodiment and the accompanying drawings, in which.

Figure 1:
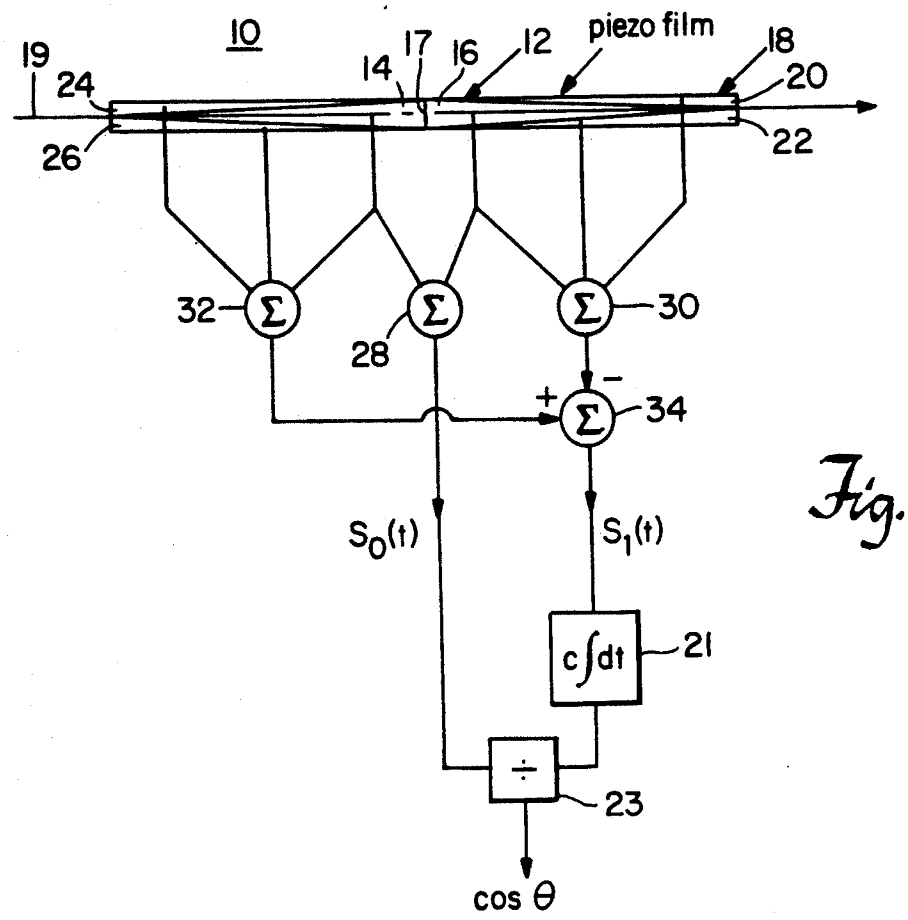
FIG. 1 is a schematic plan view of a transducer using rhombic and rectangular areas according to this invention.
Figure 2:
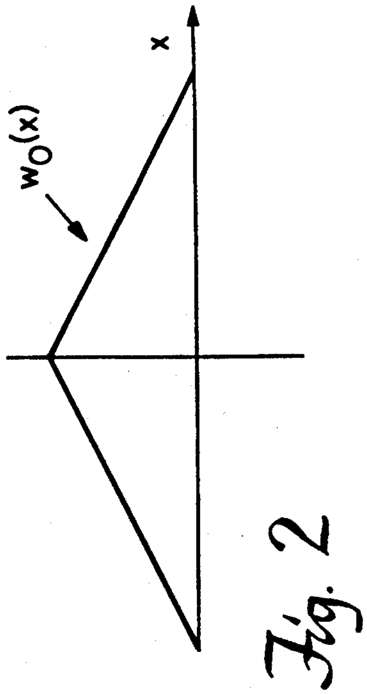
FIG. 2 is an illustration of an aperture shading according to this invention utilized in the transducer of FIG. 1.

There is shown in FIG. 1 transducer 10 according to this invention including a first rhombic-shaped sensor area 12 including two segments 14 and 16 and a rectangular sensor area 18 which is formed from the two rhombic segments 14 and 16 plus the two pairs of end segments 20, 22 and 24, 26. The outputs from sensor areas 12 and 18 are separately summed. The output from rhombic sensor area 12 is derived from segments 14 and 16 combined in summer 28 to provide the signal $S_0(t)$. The output of the rectangular sensor area 18 is derived from segments 16, 20 and 22 combined in summer 30, and the outputs from segments 14, 24 26 are combined in summer 32. The outputs of summers 30, 32 are then combined in summer 34 to provide the output signal $S_1(t)$. Rhombic sensor area 12 and rectangular sensor area 18 are a set of derivative matched apertures aligned along sensing axis 19. Rhombic sensor area 12 is represented by the triangular shading $w_0(x)$ as shown in FIG. 2. The derivative of $w_0(x)$ is rectangular shading $w_1(x)$ shown in FIG. 3. By simply dividing $S_0(t)$ by $S_1(t)$, temporally integrating, and multiplying by the speed of sound in the acoustic medium, the cosine of the angle of incidence of an acoustic wave can be determined, from which the direction of the wave is obvious. This is accomplished in FIG. 1 by integrating $S_1(t)$ and scaling it by the speed of sound c in integration circuit 21 and then dividing the result by $S_0(t)$ in divider 23 to obtain cos as more fully explained below.

Figure 4:
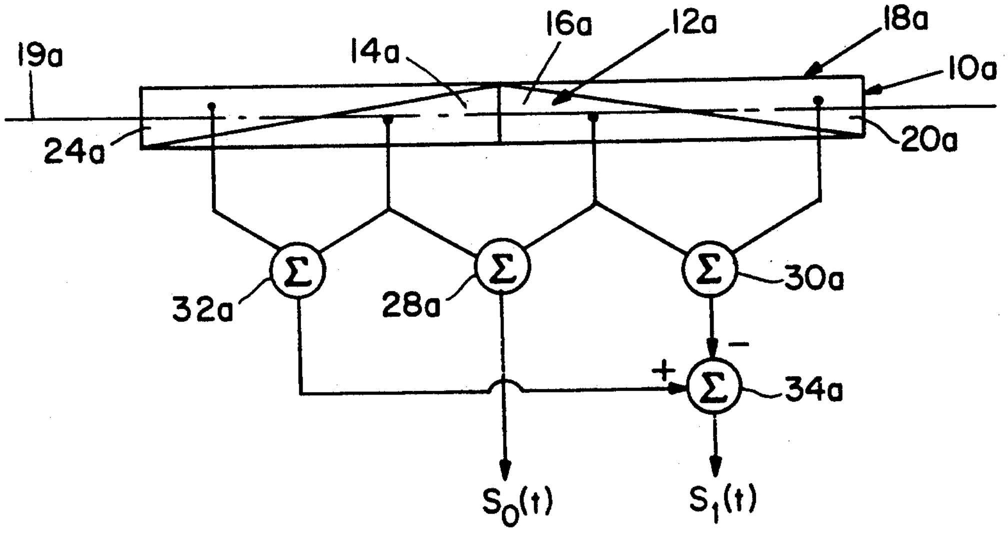
FIG. 4 is a schematic plan view similar to FIG. 1 of a transducer using triangular and rectangular sensor areas.
Figure 3:
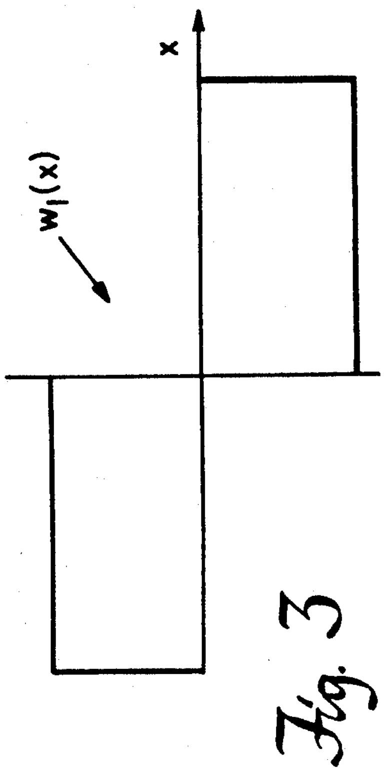
FIG. 3 is the spatial derivative of the aperture shading of FIG. 2.
Figure 6:
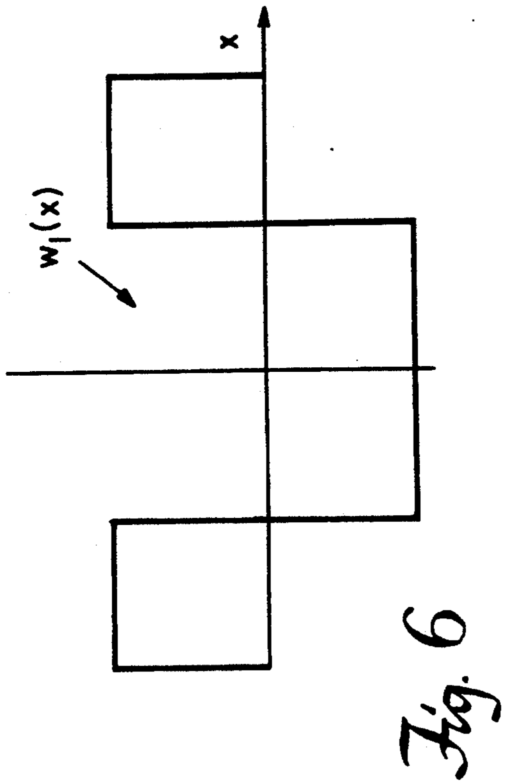
FIG. 6 is the spatial derivative of the aperture shading of FIG. 5.
Figure 5:
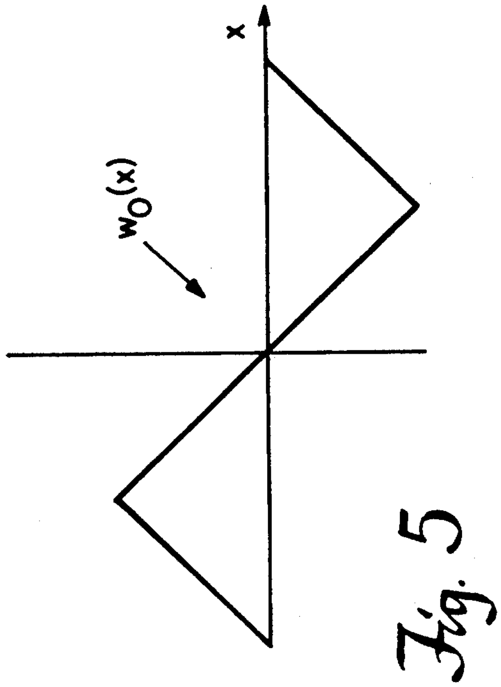
FIG. 5 is a view similar to FIG. 2 of an alternative aperture shading.

The derivative matched apertures of the transducer are not limited to rhombic and rectangular shapes. For example, as shown in FIG. 4, transducer 10a may include a triangular sensor area 12a and a rectangular sensor area 18a. In this case, triangular sensor area 12a includes two segments 14a and 16a, while rectangular area 18a includes those two segments 14a and 16a and two additional segments 20a and 24a. The two segments 14a and 16a of triangular sensor area 12a are combined in summer 28a while the outputs of segments 14a and 24a are combined in summer 32a and the outputs from segments 12a and 20a are combined in summer 30a. The output of summer 28a is the signal $S_0(t)$ and the output from summers 30a and 32a are combined in summer 34a to yield signal $S_1(t)$. These two signals again may be divided and processed to provide the cosine of the incidence angle of an acoustic wave. The form of the apertures represented by the sensor areas 12a, 18a in FIG. 4 are depicted in FIGS. 2 and 3. FIG. 5 shows a triangular shading, $w_0(x)$, whose derivative, $w_1(x)$, FIG. 6, is a pair of mirror image rectangular shadings. The sensor may be made of piezoelectric material, polyvinyldene fluoride, voided polyvinyldene fluoride, copolymer ($PVF_2/PVF_3$), or other suitable mediums.

Figure 7:
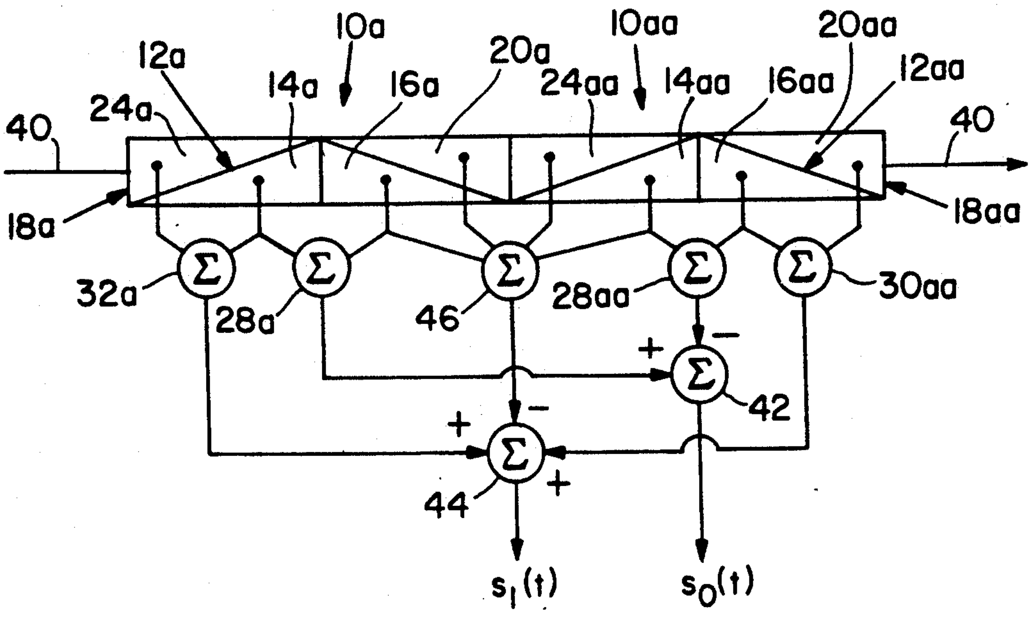
FIG. 7 is a schematic plan view showing a plurality of transducers such as shown in FIG. 4.
Figure 8:
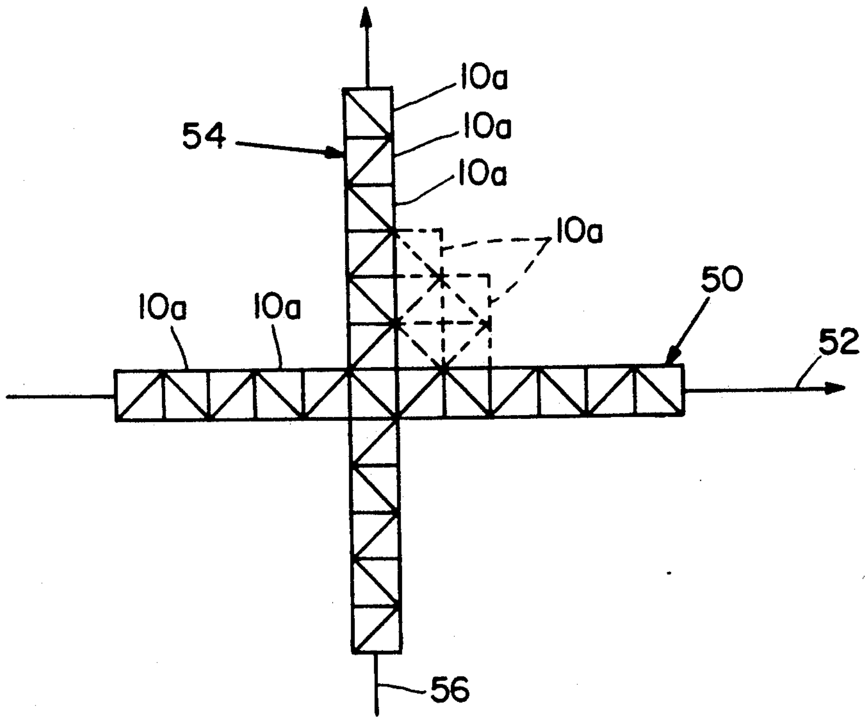
FIG. 8 is a schematic plan view of two pluralities of transducers, one extending vertically, the other horizontally along their respective longitudinal axes, according to this invention.

Although thus far in FIGS. 1 and 4 the transducers are illustrated as having only one stage, this is not a necessary limitation of the invention, for as shown in FIG. 7, two or more transducers 10a, 10aa, may be assembled along the sensing axis 40. Segments 14a and 16a are combined in summer 28a and segments 14aa and 16aa of triangular sensor area 12aa are combined in summer 28aa. The outputs of summers 28a and 28aa are combined in summer 42 to provide output $S_0(t)$. Segments 24a, 14a, are combined in summer 32a and then submitted to summer 44. The outputs from segments 16aa and 20aa are combined in summer 30aa and delivered to summer 44. Finally, the outputs from segments 16a and 20a and from 14aa and 24aa are combined in summer 46, which is shared by both 10a and 10aa and submitted to summer 44, whose output is $S_1(t)$. A plurality of such devices 10a can be arranged, FIG. 8, in a horizontal array 50 with a horizontal sensing axis 52, and in a vertical array 54 having a vertical sensing axis 56. An entire area array can be made by simply adding additional sensor arrays 10a in the area around arrays 50 and 54 as shown in phantom.

Figure 9:
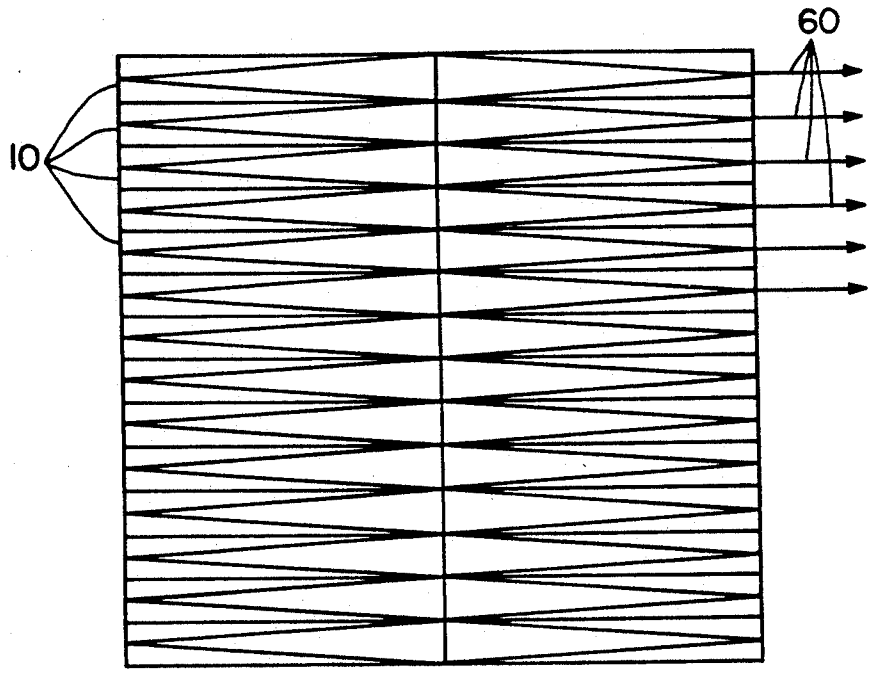
FIG. 9 is a schematic plan view of a transducer according to this invention similar to that shown in FIG. 1 with the transducers stacked laterally, orthogonal to the sensing axis.

Several transducers can be stacked laterally as shown in FIG. 9, in a direction transverse to their sensing axes 60 so that monopulse processing occurs horizontally along the sensor axes but conventional steering is applied vertically, in the lateral direction transverse to the sensor axes 60.

Figure 10:
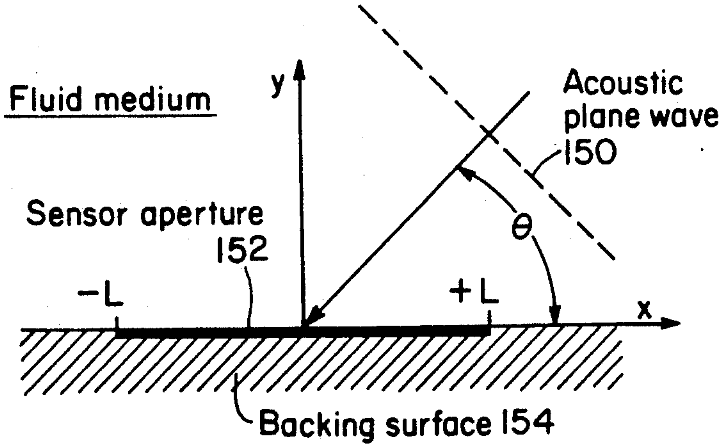
FIG. 10 is a schematic view defining the geometry wherein an obliquely-incident acoustic plane wave impinges on the transducer aperture.

It can be seen that the derivative matched apertures provide a progressive spatial phase variation between the output signals $S_0(t)$ and $S_1(t)$, facilitating the resolution of a target's direction cosine, as follows. Consider the oblique incidence geometry depicted in FIG. 10. A monochromatic acoustic plane wave 150 impinges on a surface 152 coincident with the x-axis at an angle $\theta$. This wave may be represented mathematically by $$p(x,t) = P\exp\left[i\left(\omega t + \frac{\omega x}{c}\cos\theta + \frac{\omega y}{c}\sin\theta\right)\right], \tag{1}$$

where $\omega$ is the angular frequency of the wave, c is the speed of sound in the fluid medium, and P is the complex magnitude of the wave. The sensor aperture is of length 2L, deposited atop the rigid surface 154 along the sensing axis X, and without loss of generality is assumed to have unit width. The output $S_0(t)$ from a sensor having spatial shading $w_0(x)$ is then $$s_0(t) = \int_{-L}^{L} w_0(x)P\exp\left[i\left(\omega t + \frac{\omega x}{c}\cos\theta\right)\right]dx = P\,exp(i\omega t)\hat{W}_0\left(\frac{\omega}{c}\cos\theta\right), \tag{2}$$

where $\hat{w}_0$ denotes the spatial Fourier transform of the shading $w_0(x)$ with respect to the independent variable $(\omega/c)\cos\theta$. The output $S_1(t)$ from a sensor having spatial shading $w_1(x)$ is $$s_1(t) = \int_{-L}^{L} w_1(x) P \exp\left[ i\left( \omega t + \frac{\omega x}{c}\cos\theta \right)\right] dx = \tag{3}$$

$$P\,exp(i\omega t)\hat{W}_1\left(\frac{\omega}{c}\cos\theta\right),$$

where $\hat{w}_1$ denotes the spatial Fourier transform of the shading $w_1(x)$ with respect to the independent variable $(\omega/c)\cos\theta$. Since the shading $w_1(x)$ is assumed to be the spatial derivative of the shading $w_0(x)$, $$s_1(t) = \int_{-L}^{L} \frac{d[w_0(x)]}{dx} P \exp\left[ i\left( \omega t + \frac{\omega x}{c}\cos\theta \right)\right] dx = \tag{4}$$

$$i\frac{\omega}{c}\cos\theta\left[ P\,exp(i\omega t)\hat{W}_0\left(\frac{\omega}{c}\cos\theta\right)\right].$$

Consequently, the ratio of the signals $S_1(t)$ and $S_0(t)$ is $$m = \frac{s_1(t)}{s_0(t)} = i\frac{\omega}{c}\cos\theta. \tag{5}$$

The direction cosine $\cos\theta$, and hence the incidence angle $\theta$, can be inferred from the derivative-matched sensor aperture signal outputs by temporally integrating the ratio m and multiplying by the medium's sound speed c. Since the result is independent of frequency $\omega$, the method is broadband; hence the incident acoustic wave can consist of a more general aggregate spectrum.

Figure 11:
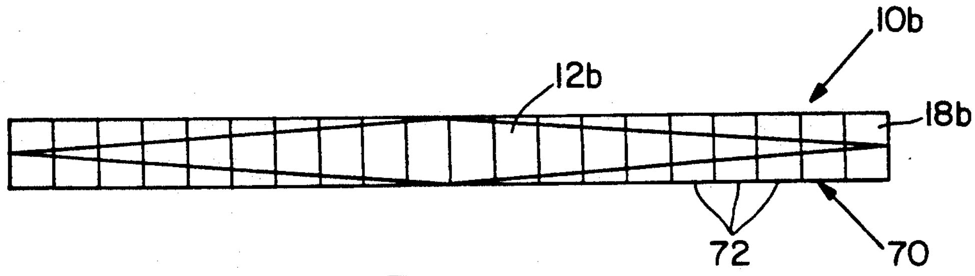
FIG. 11 is an enlarged schematic plan view of a transducer similar to FIG. 1 including a third sensor area superimposed on the first two and including a plurality of sensor sections.

Although the transducer of this invention very simply and efficiently detects a target and locates its direction, it may be desirable to obtain additional data from the target. This can be done by adding a third sensor area 70, FIG. 11, which includes a plurality of sensor sections 72 superimposed on rhombic sensor area **12*b* and rectangular sensor area 18*b*** so that supplementary data available through conventional steering systems can be obtained.

Figure 12:
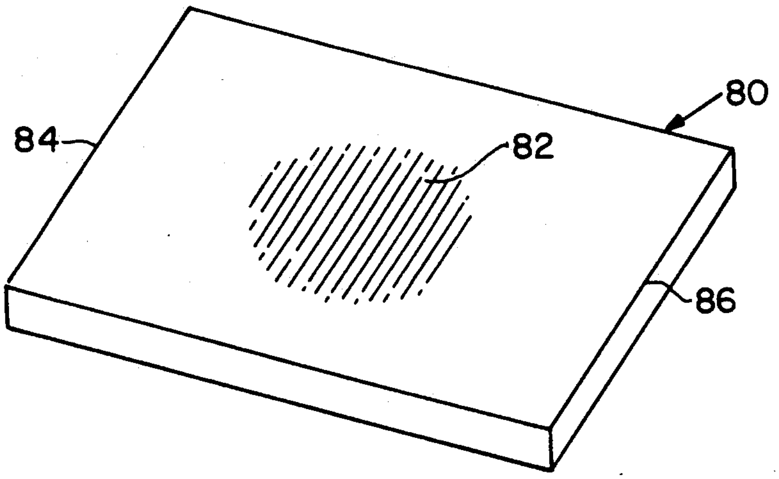
FIG. 12 is a schematic illustration of a piezoelectric layer with spatially variable sensitivity.
Figure 13:
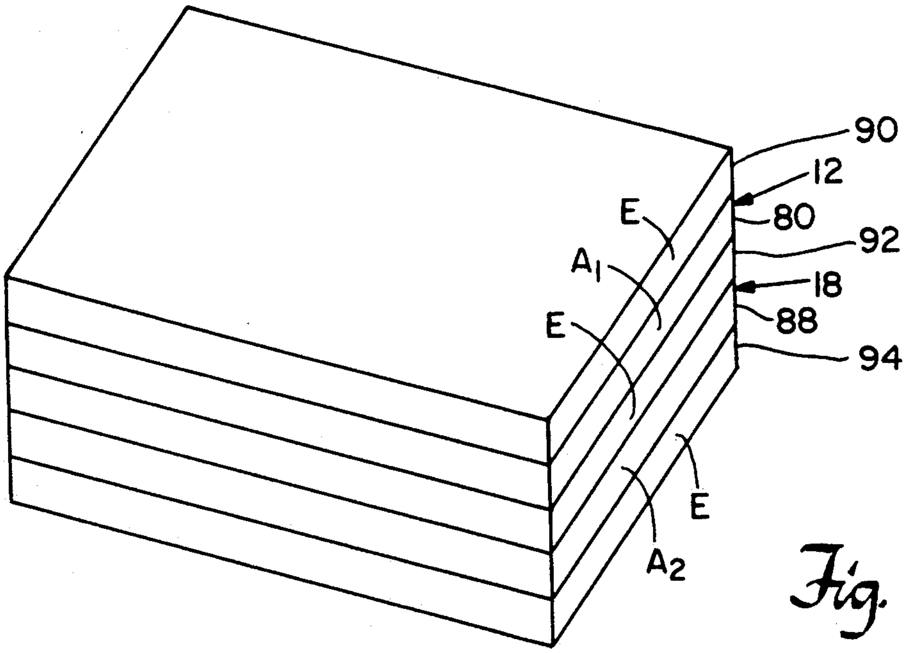
FIG. 13 is a three-dimensional diagrammatic view of a transducer according to this invention using the spatially varied piezoelectric layer of FIG. 12.

While thus far the spatial variations have been shown to be achieved by discrete elements, this is not a necessary limitation of the invention. The variation in the shapes of the sensor areas 12 and 18 may also be accomplished by using as a sensing medium a piezoelectric layer 80, FIG. 12, having a spatial variation in the spatial sensitivity so that the sensitivity is higher in the center area 82 than it is at either end 84 and 86. This implements sensor area 12. A second layer with a derivative-matched spatial variation implements rectangular sensor area 18. These two sensitive media 80 and 88 constituting sensor areas 12 and 18, FIG. 13, may be sandwiched between electrodes 90, 92 and 94 to provide suitable outputs to the summing circuits.

Figure 14:
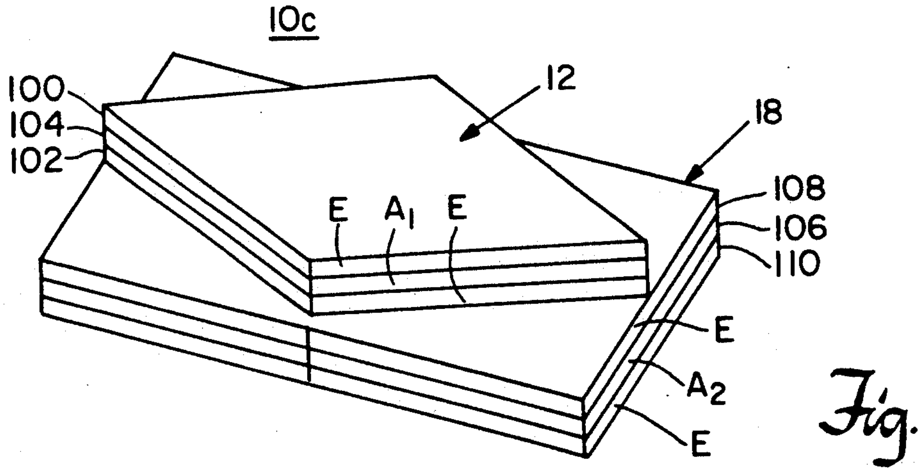
FIG. 14 is a three-dimensional diagrammatic view of a transducer in which the two sensor areas are formed of independent sensing material.
Figure 15:
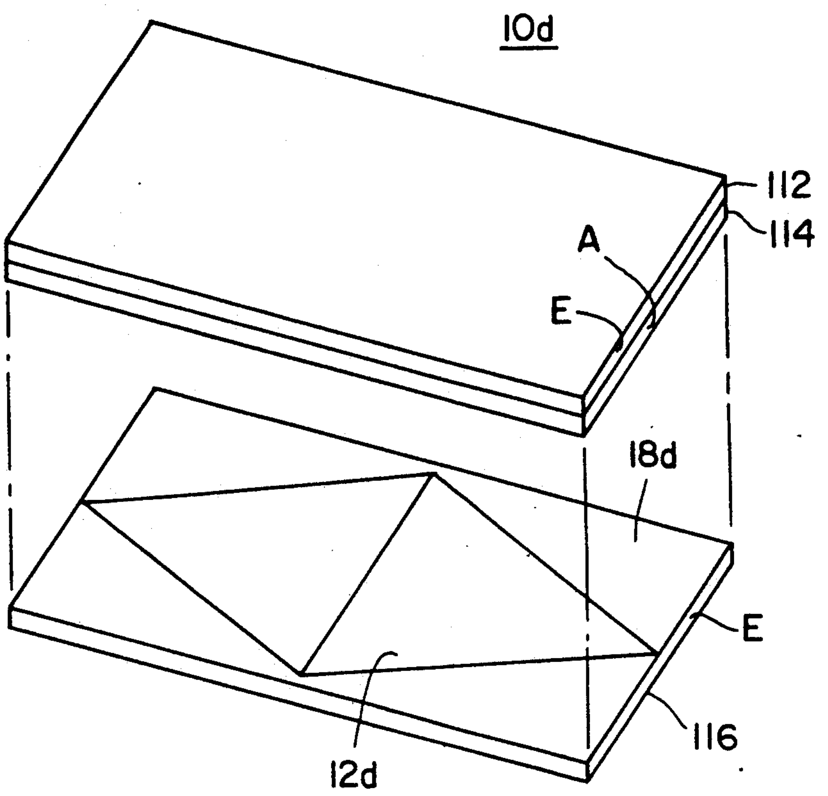
FIG. 15 is a three-dimensional diagrammatic exploded view of a transducer having rhombic and rectangular sensor areas according to this invention in which the sensor areas are defined by an electrode.
Figure 16:
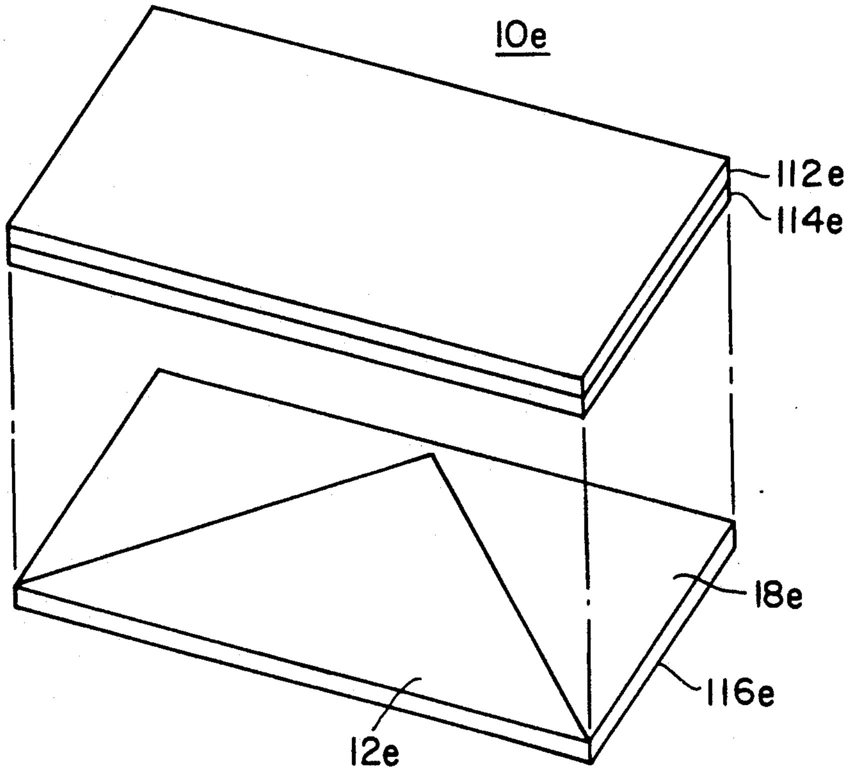
FIG. 16 is a three-dimensional diagrammatic exploded view of a transducer according to this invention having triangular and rectangular sensor areas.

Alternatively, sensor area 12 may be made up of electrodes 100, 102, FIG. 14, with a piezoelectric layer 104 between them all cut to have a rhombic shape. The rhombic sensor area 12 is superimposed on the rectangular sensor area 18, which consists of a second layer 106 sandwiched between two more electrodes 108 and 110. In yet another construction, the electrode 112, FIG. 15, and piezoelectric layer 114 may be uniform, while the lower electrode 116 may be shaped to define the rhombic **12*d* and rectangular 18*d* sensor areas. A similar construction may be used with triangular sensor area 12*e* replacing rhombic sensor area 12*d*, FIG. 16**.

Figure 17:
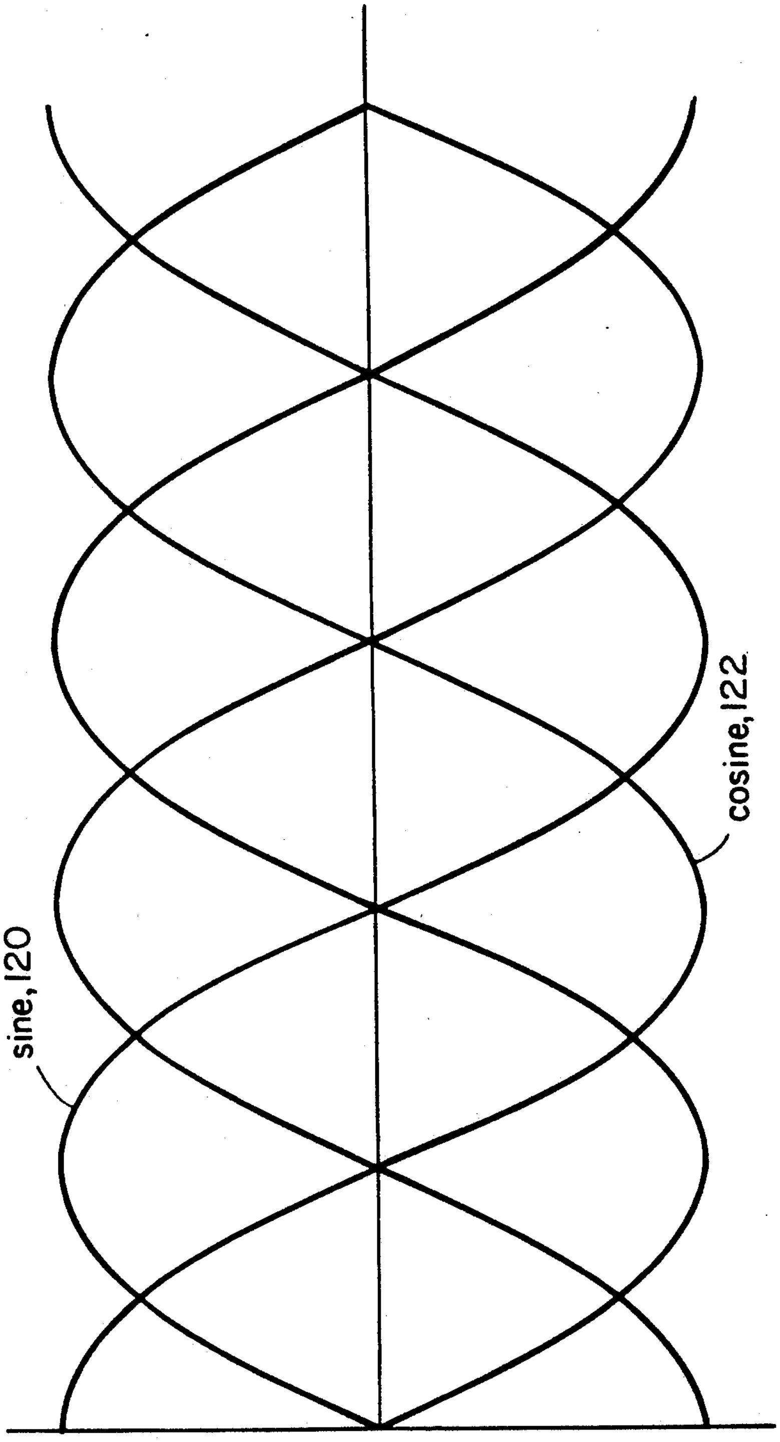
FIG. 17 is an illustration of two sensor areas, one of which is a derivative of the other, in which the areas take the forms of sine and cosine.

Although only two derivative matched shadings have been depicted thus far, many different matched shapes may be used. For example, as shown in FIG. 17, the first sensor area may be sinusoidal 120, and the second may be the derivative of the sine, or the cosine 122, so the transducer charge collection electrode has a contour as shown in FIG. 17.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A wideband, derivative-matched, continuous aperture acoustic transducer, comprising:

a first sensor area having a predetermined spatial shading with a spatial derivative; and a second sensor area having a spatial shading which is the spatial derivative of the spatial shading of said first area; said first and second spatially shaded areas being at least partially superimposed and coextensive along a sensing axis.

2. The wideband, derivative-matched, continuous aperture transducer of claim 1 further including means for combining the output of said first sensor area with the output of said second sensor area to obtain a signal proportional to the cosine of the angle of incidence of an acoustic wavefront.

3. The wideband, derivative-matched, continuous aperture transducer of claim 1 in which one of said sensor areas includes at least a portion of the other sensor area.

4. The wideband, derivative-matched, continuous aperture transducer of claim 1 in which one of said sensor areas includes all of the other sensor area.

5. The wideband, derivative-matched, continuous aperture transducer of claim 1 in which said first sensor area includes said second sensor area.

6. The wideband, derivative-matched, continuous aperture transducer of claim 1 in which the shape of said second sensor area is the spatial derivative of the shape of said first sensor area.

7. The wideband, derivative-matched, continuous aperture transducer of claim 1 in which said first and second sensor areas have spatially varying sensitivity characteristics and the spatially varying sensitivity characteristic of said second sensor area is the spatial derivative of spatially varying sensitivity characteristic of said first sensor areas.

8. The wideband, derivative-matched, continuous aperture transducer of claim 1 in which said first sensor area is rhombic and said second sensor area is rectangular.

9. The wideband, derivative-matched, continuous aperture transducer of claim 2 in which said means for combining includes means for integrating and scaling the output of said second sensor, and means for dividing the output of said first sensor by the output of said means for integrating and scaling.

* * * * *